United States Patent
Hsieh

(10) Patent No.: US 8,095,332 B2
(45) Date of Patent: Jan. 10, 2012

(54) METHOD FOR PRE-HEATING HARD DISK DRIVE OF COMPUTER DEVICE

(75) Inventor: Yi-Chung Hsieh, Bade (TW)

(73) Assignee: Getac Technology Corporation, Hsinchu (TW)

( * ) Notice: Subject to any disclaimer, the term of this patent is extended or adjusted under 35 U.S.C. 154(b) by 402 days.

(21) Appl. No.: 12/232,024

(22) Filed: Sep. 10, 2008

(65) Prior Publication Data

US 2010/0061011 A1   Mar. 11, 2010

(51) Int. Cl.
*G01K 1/08* (2006.01)
(52) U.S. Cl. ............................ 702/132; 702/130; 702/99
(58) Field of Classification Search .................... 702/33, 702/99, 127, 130, 132–136; 361/88, 92, 361/93.8, 103, 158, 162, 165, 679.31, 679.33, 361/712
See application file for complete search history.

(56) References Cited

U.S. PATENT DOCUMENTS

| | | | |
|---|---|---|---|
| 4,967,155 A | 10/1990 | Magnuson | |
| 6,453,679 B1 * | 9/2002 | Aoyagi et al. | 62/3.4 |
| 6,845,344 B1 * | 1/2005 | Lally et al. | 702/186 |
| 7,009,797 B2 * | 3/2006 | Zayas et al. | 360/69 |
| 7,050,254 B1 * | 5/2006 | Yu et al. | 360/55 |
| 7,126,778 B2 * | 10/2006 | Lamberts | 360/69 |
| 7,243,043 B2 * | 7/2007 | Shin | 702/182 |
| 7,719,792 B2 * | 5/2010 | Strom et al. | 360/97.02 |
| 2003/0081934 A1 | 5/2003 | Kirmuss | |
| 2003/0099055 A1 * | 5/2003 | Kim et al. | 360/69 |
| 2003/0142439 A1 | 7/2003 | Hidaka et al. | |
| 2004/0228023 A1 * | 11/2004 | Keller et al. | 360/69 |
| 2005/0004717 A1 * | 1/2005 | Fukushima et al. | 700/299 |
| 2006/0010353 A1 * | 1/2006 | Haugh | 714/47 |
| 2006/0164746 A1 * | 7/2006 | Son et al. | 360/69 |
| 2007/0146923 A1 | 6/2007 | Imai et al. | |
| 2010/0208382 A1 * | 8/2010 | Sakabe | 360/69 |

FOREIGN PATENT DOCUMENTS

| | | | |
|---|---|---|---|
| CA | 2596753 A1 * | 2/2008 | |
| JP | 2007058994 A * | 3/2007 | |
| JP | 2007234142 A * | 9/2007 | |
| WO | WO2006/108294 | 10/2006 | |

* cited by examiner

*Primary Examiner* — Drew A Dunn
*Assistant Examiner* — Timothy H Hwang

(57) ABSTRACT

Disclosed is a method for pre-heating a hard disk drive of a computer device, wherein a temperature sensor and a heater are arranged at preset locations outside the computer device. The temperature sensor detects an external temperature of the hard disk drive, which is compared with an activation temperature threshold stored in a data memory unit of the computer device. The activation temperature threshold is calibrated by a preset compensation value stored in the data memory unit. When the external temperature of the hard disk drive subtracting the preset compensation value is less than the activation temperature threshold of the hard disk drive, the activation of the hard disk drive is prohibited and the heater carries out heating on the hard disk drive until the activation temperature threshold of the hard disk drive is reached; thereafter, the hard disk drive is activated again. Thus, the hard disk drive is protected from damage caused by excessively low internal temperature of the hard disk drive at the time when the hard disk drive is activated.

9 Claims, 6 Drawing Sheets

METHOD FOR PRE-HEATING HARD DISK DRIVE OF COMPUTER DEVICE

FIELD OF THE INVENTION

The present invention relates to a method for pre-heating a hard disk drive of a computer device, and in particular to a hard-disk pre-heating method that compensates temperature difference between inside and outside of a hard disk drive.

BACKGROUND OF THE INVENTION

A hard disk drive of a conventional computer device is subject to temperature constraint for the operation thereof. When the hard disk drive is forced to operation at a temperature below the temperature constraint thereof, the hard disk drive is easy to damage. Thus, when a hard disk drive is in a low temperature environment, a hard-disk pre-heating device is often provided to pre-heat the hard disk drive to a proper temperature range before the hard disk drive is put into operation.

To satisfy the above needs, heretofore, various methods were suggested. In these known methods, most of them set a heater on a surface of a hard disk drive or include a heating pad evenly set on a surface of a hard disk drive. A temperature sensor is further arranged on a surface of the hard disk drive to detect the temperature of the hard disk drive. Before the hard disk drive is activated, the temperature of the hard disk drive is first detected by the temperature sensor, so that when the temperature is lower than a preset hard-disk activation temperature, the heater performs pre-heating to the hard disk drive to have the temperature of the hard disk drive reaching the preset hard-disk activation temperature and thereafter, the hard disk drive is set in operation.

Further, various methods are disclosed in prior art references, such as U.S. Pat. No. 7,035,031 and JP 5,205,461, which use a hard-disk pre-heating system that provides a temperature sensor and a heater outside a hard disk drive. The heater is arranged on a surface of the hard disk drive at a location close to a spindle or a motor of the hard disk drive, or takes a form of a heating pad that is evenly set on a surface of a hard disk drive. The temperature sensor is arranged on a surface of the hard disk drive to detect the temperature of the hard disk drive. When it is desired to activate the hard disk drive, but the temperature is lower than a preset hard-disk activation temperature, the heater carries out pre-heating on the hard disk drive until the preset hard-disk activation temperature is reached, and thereafter, the hard disk drive is activated for operation.

SUMMARY OF THE INVENTION

However, in the known techniques, a key issue is present between the heater and the temperature sensors in that the temperature value detected by the temperature sensor is limited to the surface of the hard disk drive, meaning the temperature detected is an surface temperature of the hard disk drive, rather than an actual internal temperature of the hard disk drive, which presents a difference with respect to the actual internal temperature of the hard disk drive. Further, the heat generated by the heater has to conduct from outside the hard disk drive to inside of the hard disk drive so that the difference between the surface temperature of the hard disk drive and the internal temperature of the hard disk drive is made even more pronounced. Such a temperature difference, when excessively large, may cause the hard disk drive to be set into operation before the temperature has not really reached the preset hard-disk activation temperature, often resulting in damages to the hard disk drive.

Thus, an objective of the present invention is to provide a hard-disk pre-heating method that employs a preset compensation value to correct a hard-disk activation temperature threshold to be used in a low temperature environment to pre-heat the hard disk drive to a preset temperature before the hard disk drive can be set into operation, thereby protecting the hard disk drive from damage caused by activation of the hard disk drive in a low temperature.

Another objective of the present invention is to provide a hard-disk pre-heating method that performs calibration of the preset compensation value of the hard disk drive after each activation of the hard disk in order to make the compensation value more precisely set.

A further objective of the present invention is to provide a hard-disk pre-heating method that employs a preset compensation value to correct a hard-disk activation temperature threshold to be used in a low temperature environment. The preset compensation value is obtained from averaging the preset compensation values of a plurality of hard disk drives.

The technique solution adopted by the present invention to overcome the above problems is a method for pre-heating a hard disk drive of a computer device, wherein a temperature sensor and a heater are arranged at preset locations outside the computer device. The temperature sensor detects a hard-disk external temperature of a hard disk drive, which is compared with an activation temperature threshold stored in a data memory unit of the computer device, the activation temperature threshold being calibrated by using a preset compensation value stored in the data memory unit, whereby when the hard-disk external temperature subtracting the preset compensation value is less than the activation temperature threshold of the hard disk drive, activation of the hard disk drive is prohibited, and the heater heats the hard disk drive to reach the activation temperature threshold of the hard disk drive. Thereafter, the hard disk drive is allowed to start up. Each time the hard disk drive is activated, a basic input/output system of the computer device acquires a hard-disk internal temperature of the hard disk drive for effecting calibration so that the preset compensation value for each activation of the hard disk drive can be made more precise.

With the technique solution provided by the present invention, the operation of a hard-disk pre-heating system is made more precise, eliminating the potential risk of damaging a hard disk drive simply due to errors of the temperatures inside and outside the hard disk drive. Also, the time periods for unnecessary pre-heating of the hard disk drive can be shortened, eliminating waste of time and delay of computer booting caused by errors of the temperatures inside and outside the hard disk drive, eventually making the booting process of the computer device more efficient. The present invention also features a method of obtaining a preset compensation value through a plurality of hard disk drives, and using a plurality of hard disk drives to obtain an averaged preset compensation value makes the error even smaller.

BRIEF DESCRIPTION OF THE DRAWINGS

The present invention will be apparent to those skilled in the art by reading the following description of the best mode for carrying out the present invention, with reference to the attached drawings, in which.

DETAILED DESCRIPTION OF THE PREFERRED EMBODIMENTS

Figure 1:
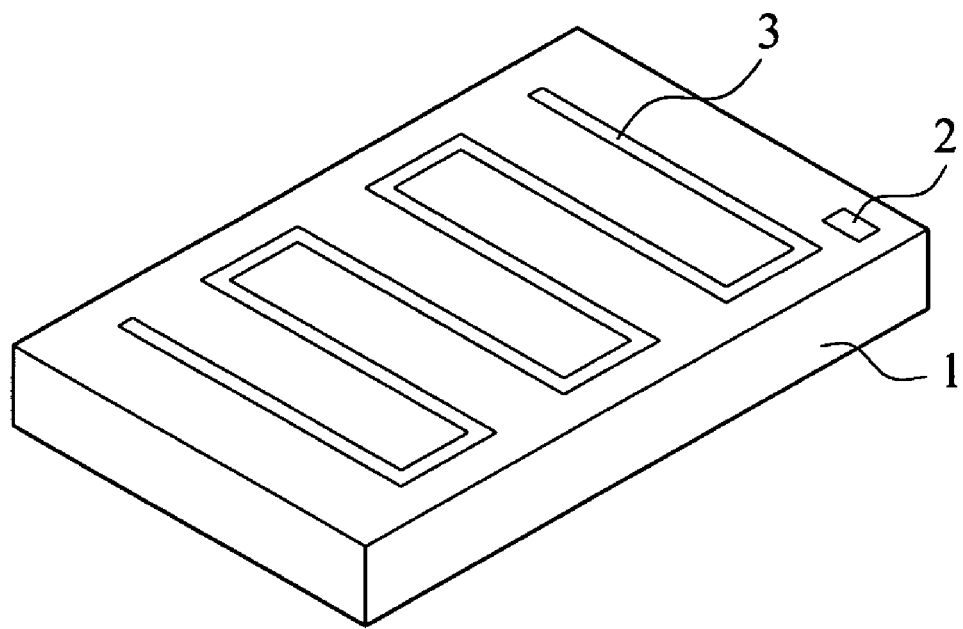
FIG. 1 is a perspective view illustrating a first embodiment in accordance with the present invention.

With reference to the drawings and in particular to FIG. 1, which is a perspective view illustrating a first embodiment in accordance with the present invention, a computer device 100 has a hard disk drive 1 having an internal temperature sensor and a surface on which a temperature sensor 2 and a heater 3 are arranged at preset locations. The temperature sensor 2 functions to detect a hard-disk external temperature Te outside the hard disk drive 1. The heater 3 functions to heat the hard disk drive 1 at specific conditions for pre-heating the hard disk drive 1 before activation so as to prevent the hard disk drive 1 from being activated in an excessively low temperature, which may cause damage to the hard disk drive 1.

Figure 2:
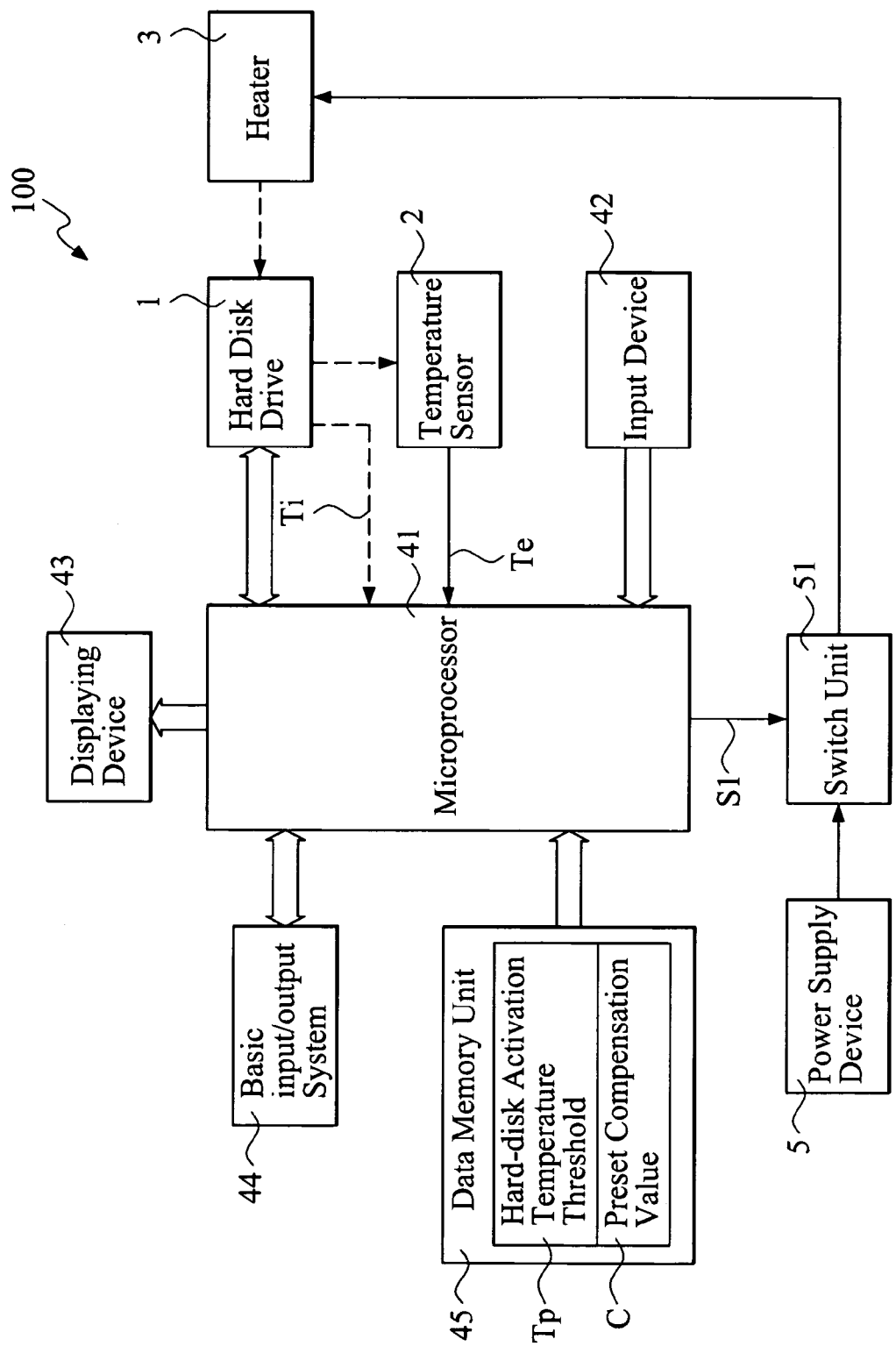
FIG. 2 is a system block diagram of the first embodiment of the present invention.

Also referring to FIG. 2, which is a system block diagram of the first embodiment of the present invention, the computer device 100 comprises a microprocessor 41, a power supply device 5, and a switch unit 51. The microprocessor 41 controls power supplied to the heater 3 from the power supply device 5 by providing a control signal S1 to the switch unit 51.

The microprocessor 41 is connected to an input device 42, a displaying device 43, such as a liquid crystal display (LCD), a basic input/output system (BIOS) 44, and a data memory unit 45. In the embodiment illustrated, the data memory unit 45 is a separate memory that is individually connected to the microprocessor 41. However, as an alternative, the data memory unit 45 may be a memory built in the BIOS 44 of the computer device 100.

The data memory unit 45 stores at least one hard-disk activation temperature threshold Tp and a preset compensation value C. The hard-disk activation temperature threshold Tp is set as a lowest safety temperature at which the power supply device 5 is allowed to supply power to the hard disk drive 1. The preset compensation value C is defined as a preset difference between the hard-disk external temperature Te and a hard-disk internal temperature Ti and is used to correct the difference between the hard-disk external temperature Te and hard-disk internal temperature Ti.

Figure 3:
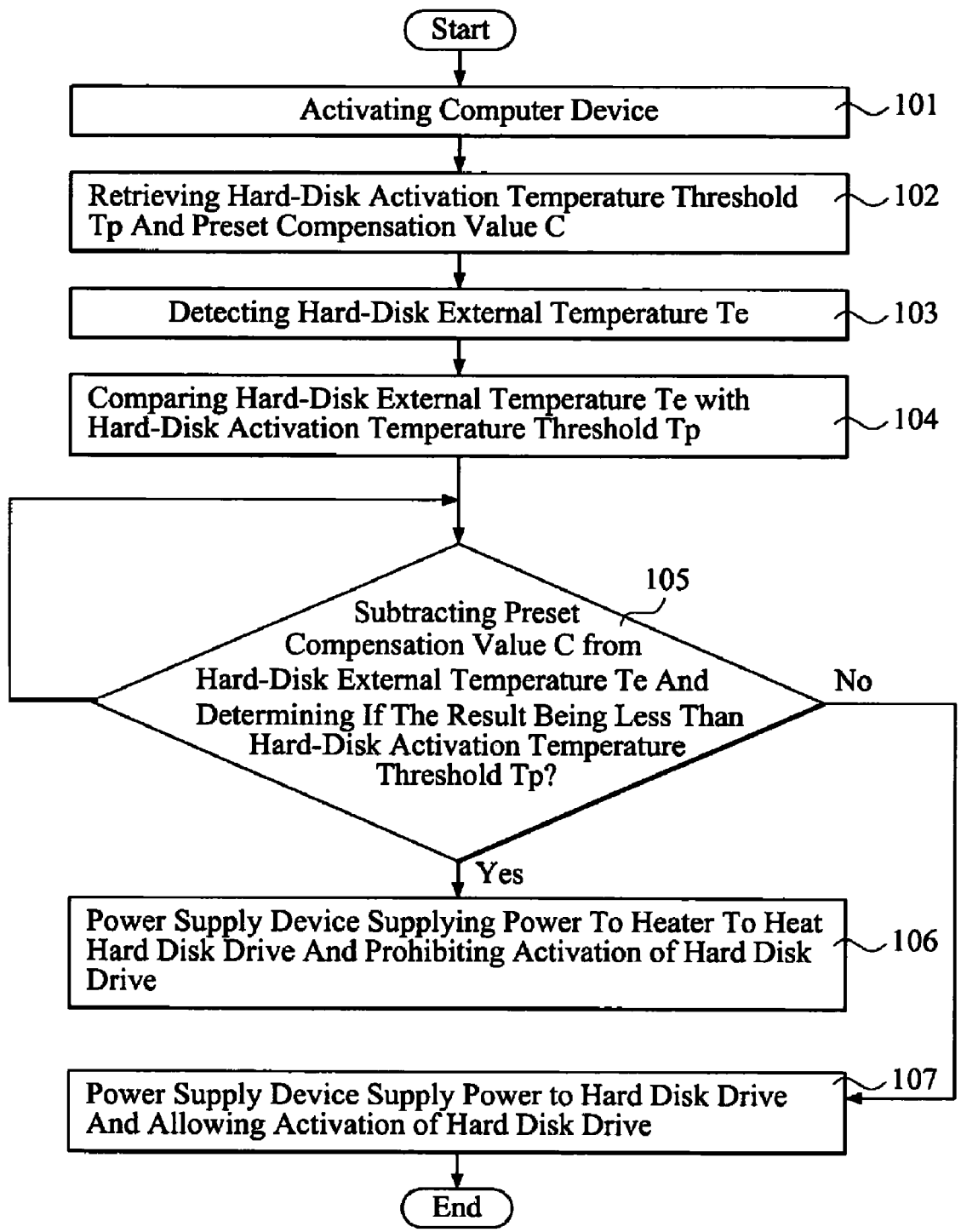
FIG. 3 shows a flow chart of the first embodiment of the present invention.

Referring now to FIG. 3, which illustrates a flow chart of the first embodiment of the present invention, together reference made to FIG. 2, an explanation of the operation of a method for pre-heating a hard disk drive of a computer device in accordance with the present invention will be given below.

The process starts with activation of the computer device 100 (step 101), followed by the microprocessor 41 retrieving the hard-disk activation temperature threshold Tp and the preset compensation value C from the data memory unit 45 (step 102) and the temperature sensor 2 detecting the hard-disk external temperature Te of the hard disk drive 1 (step 104). The microprocessor 41 compares the hard-disk external temperature Te with the hard-disk activation temperature threshold Tp (step 104), which is generally done by subtracting the preset compensation value C from the hard-disk external temperature Te, and checks if the result is less than hard-disk activation temperature threshold Tp (step 105). When the result of the hard-disk external temperature Te subtracting the preset compensation value C is less than the hard-disk activation temperature threshold Tp, it indicates that the external temperature of the hard disk drive satisfies a condition for safely operating the hard disk drive, but the internal temperature of the hard disk drive is still not satisfactory for a condition of safely operating the hard disk drive. Consequently, the power supply device 5 supplies power to the heater 3 to heat the hard disk drive 1 and the activation of the hard disk drive 1 is prohibited (step 106). When the result of the hard-disk external temperature Te subtracting the preset compensation value C is equal to the hard-disk activation temperature threshold Tp (step 106), the power supply device 5 supplies power to the hard disk drive 1 and the activation of the hard disk drive 1 is allowed (step 107). However, the heating carried out by the heater 3 is still maintained in operation for a short period of time and then stopped.

Figure 4:
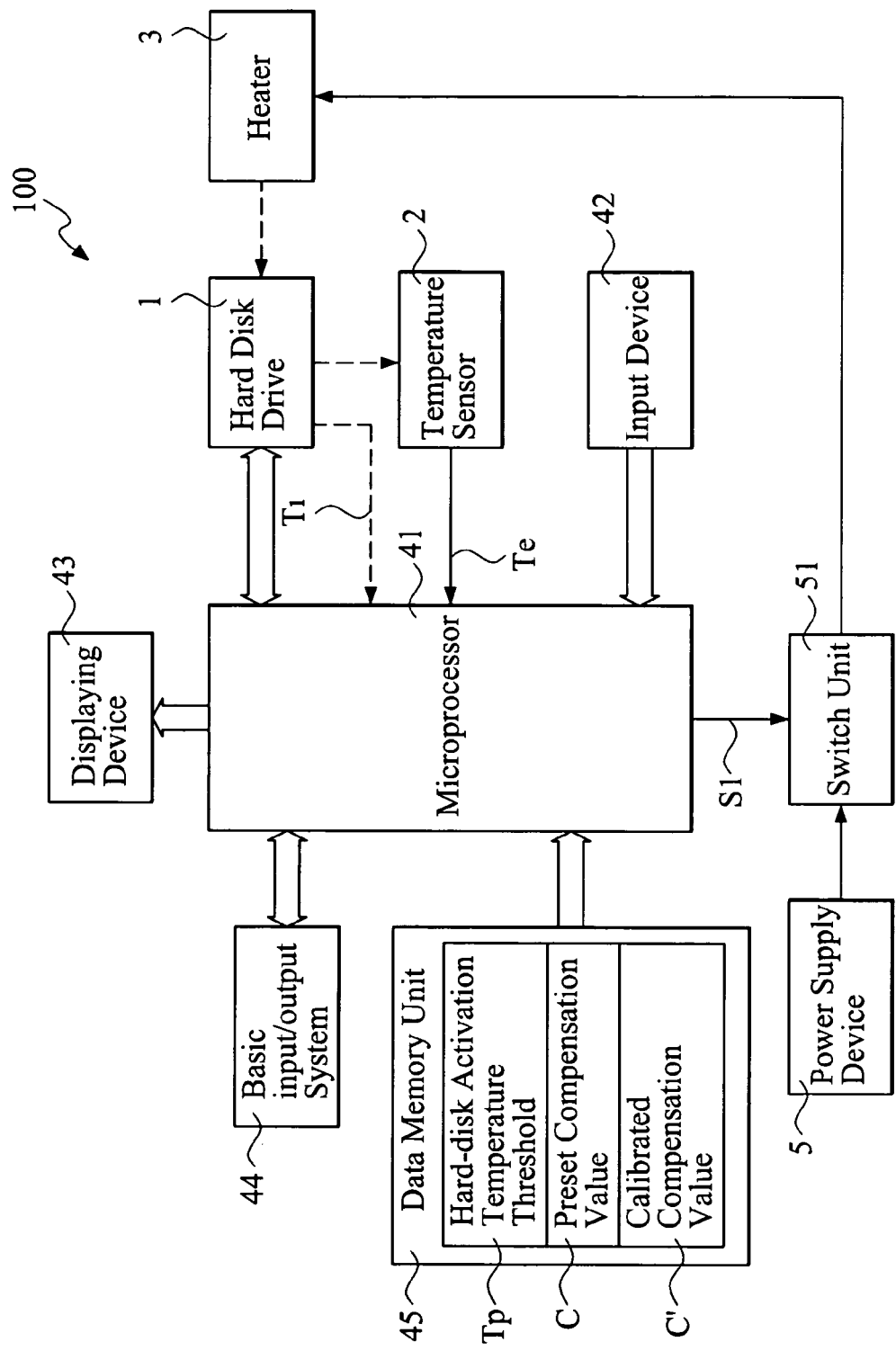
FIG. 4 is a system block diagram illustrating a second embodiment of the present invention.

Referring to FIG. 4, which is a system block diagram illustrating a second embodiment of the present invention, the major constituent components of the second are identical to those of the first embodiment and are labeled with the same reference numerals and further description is omitted herein. A difference of the instant embodiment resides in that the data memory unit 45 contains therein the hard-disk activation temperature threshold Tp, the preset compensation value C, and a calibrated compensation value C'. The calibrated compensation value C' is a value obtained by correcting the preset compensation value C and is used to replace the preset compensation value C for subsequent activation of the hard disk drive for ensuring further precision.

Figure 5:
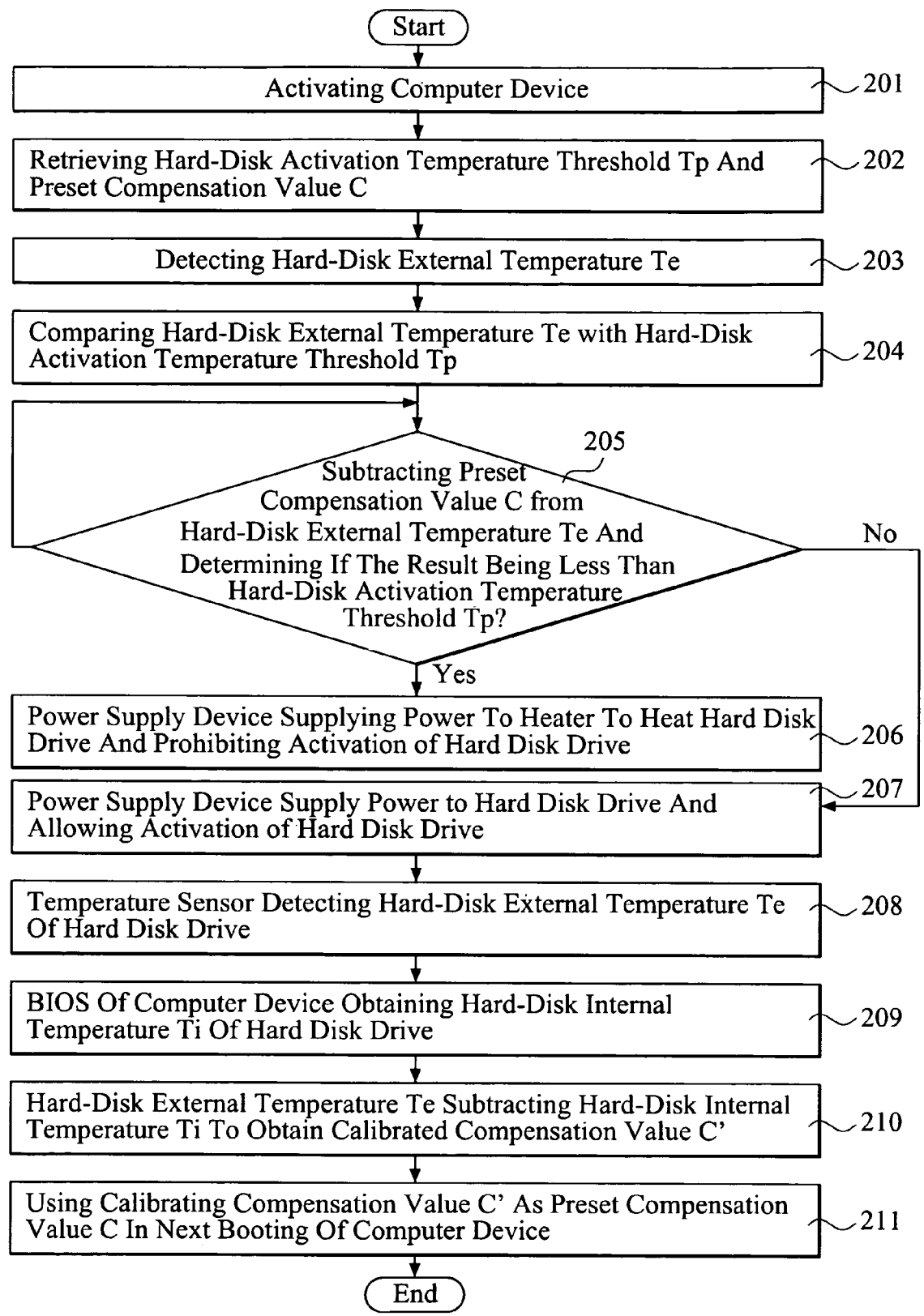
FIG. 5 shows a flow chart of the second embodiment of the present invention.

Referring to FIG. 5, which illustrates a flow chart of the second embodiment of the present invention, a portion of the flow of the instant embodiment (steps 201-207) is similar to the counterpart of the first embodiment so that further description is omitted. The difference occurs after step 207 and includes a step of correcting the hard-disk activation temperature threshold Tp to obtain a calibrated compensation value C' as just mentioned above.

After steps 201-207, the temperature sensor 2 detects the hard-disk external temperature Te of the hard disk drive 1 (step 208). The BIOS 44 of the computer device 100 obtains, for example through an internal temperature sensor of an HDD SMART system thereof, the hard-disk internal temperature Ti of the hard disk drive 1 (step 209). The hard-disk external temperature Te then subtracts the hard-disk internal temperature Ti to obtain a calibrated compensation value C' (step 210). The calibrating compensation value C' is then used as the preset compensation value C in the next booting of the computer device (step 211).

Figure 6:
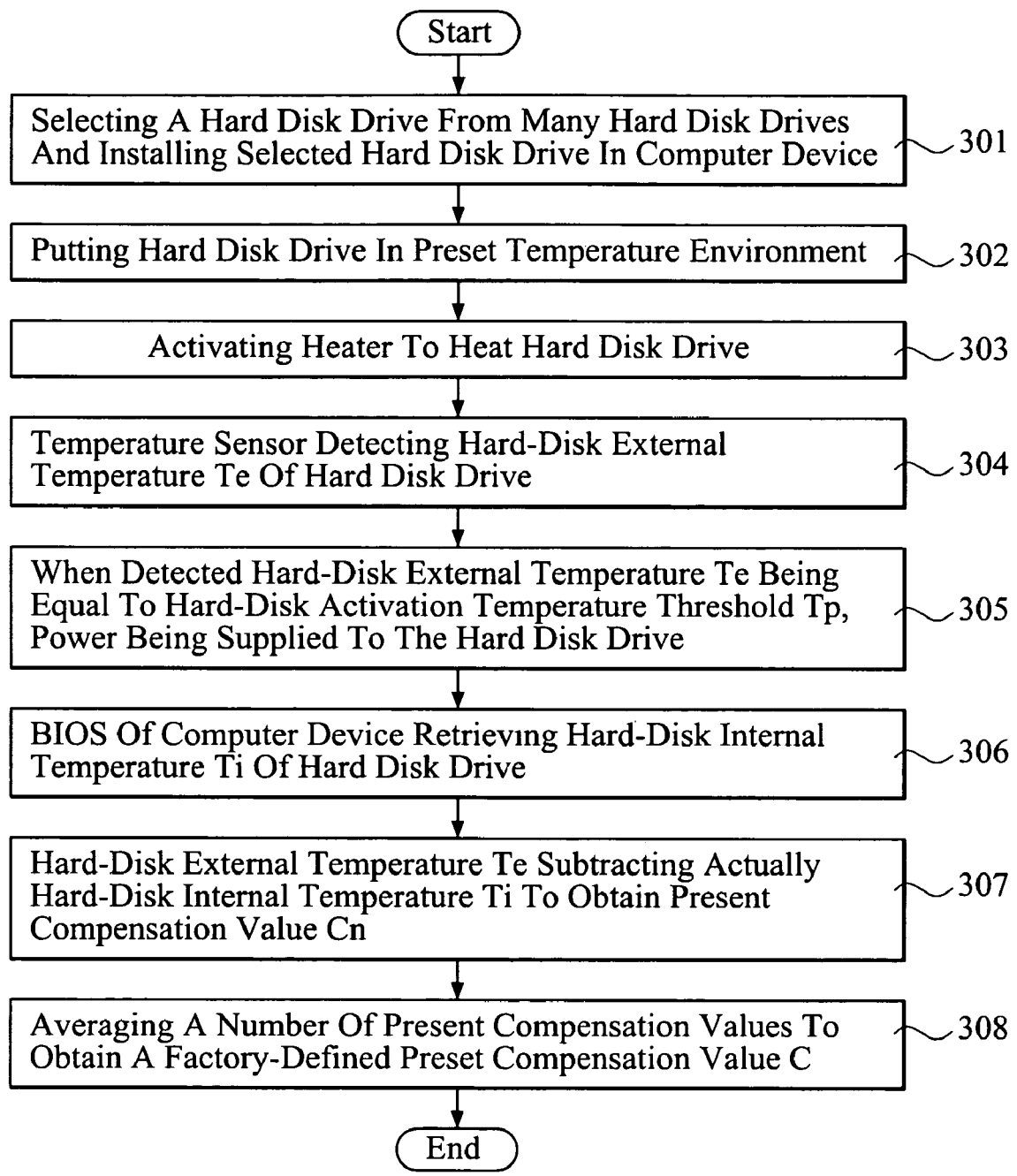
FIG. 6 shows a flow chart for obtaining a preset compensation value in accordance with the present invention.

Referring to FIG. 6, which illustrates a flow chart for obtaining a preset compensation value in accordance with the present invention, this process provides the preset compensation value used in the first and second embodiments of the present invention by the following steps.

At first, among a number of hard disk drives 1 (of which the number is set as "N"), a hard disk drive 1 (which is set as the nth one of the N hard disk drives) is randomly selected and installed in a computer device 100 (step 301). The selected hard disk drive 1 is put in a preset temperature environment, which has a temperature lower than the hard-disk activation temperature threshold Tp (step 302). The heater 3 is activated to heat the hard disk drive 1 (step 303).

The temperature sensor 2 of the hard disk drive 1 of the computer device 100 detects the hard-disk external temperature Te of the hard disk drive 1 (step 304). When the temperature sensor 2 of the computer device 100 detects that the hard-disk external temperature Te of the hard disk drive 1 is equal to the hard-disk activation temperature threshold Tp, power is supplied to the hard disk drive 1 (step 305). The BIOS 44 of the computer device 100 retrieves the hard-disk internal temperature Ti of the hard disk drive 1 (step 306). The hard-disk internal temperature Ti is obtained by selecting the lowest hard-disk internal temperature Ti from a plurality of hard-disk internal temperatures Ti that is obtained by the BIOS 44 of the computer device 100 to serve as the actually used hard-disk internal temperature Ti. The hard-disk external temperature Te then subtracts the actually used hard-disk internal temperature Ti and the result is defined as a present compensation value Cn (step 307). A number of present compensation values are obtained from a plurality of hard-disk drives and an average is calculated to serve as a factory-defined preset compensation value C (step 308), and expressed in the following formula:

$$C = \frac{\sum_{n=1}^{N} Cn}{N}$$

Although the present invention has been described with reference to the preferred embodiments thereof, as well as the best mode for carrying out the present invention, it is apparent to those skilled in the art that a variety of modifications and changes may be made without departing from the scope of the present invention which is intended to be defined by the appended claims.

What is claimed is:

1. A method for pre-heating a hard disk drive of a computer device, wherein the computer device comprises a power supply device, a microprocessor, the hard disk drive, and a data memory unit, the hard disk drive including an internal temperature sensor, an external temperature sensor being arranged at a first preset location on the hard disk drive to detect a hard-disk external temperature of the hard disk drive, a heater being arranged at a second preset location on the hard disk drive, the data memory unit storing at least one hard-disk activation temperature threshold and a preset compensation value, the hard-disk activation temperature threshold being a lowest safety temperature that the power supply device is allowed to supply power to the hard disk drive, the preset compensation value being defined as a preset difference between the hard-disk external temperature and a hard-disk internal temperature, the method comprising the following steps:
    (a) starting up the computer device and activating the external temperature sensor;
    (b) detecting the hard-disk external temperature of the hard disk drive by the external temperature sensor;
    (c) determining relative level of the hard-disk external temperature and the hard-disk activation temperature threshold by using the microprocessor;
    (d) supplying power to the heater from the power supply device to heat the hard disk drive and prohibiting activation of the hard disk drive when a result of the hard-disk external temperature subtracting the preset compensation value is less than the hard-disk activation temperature threshold; and
    (e) supplying power to the hard disk drive heater from the power supply device and activating the hard disk drive and the internal temperature sensor thereof when a result of the hard-disk external temperature subtracting the preset compensation value is equal to the hard-disk activation temperature threshold.

2. The method as claimed in claim 1, wherein the data memory unit comprises a separate memory connected to the microprocessor.

3. The method as claimed in claim 1, wherein the data memory unit comprises a memory built in a basic input and output system of the computer device.

4. The method as claimed in claim 1 further comprising, after step (a), a step of retrieving the hard-disk activation temperature threshold and the preset compensation value from the data memory unit by the microprocessor.

5. The method as claimed in claim 4, further comprising, after step (e), a step of:
    (f) executing a process of correcting the hard-disk activation temperature threshold to obtain a calibrated preset compensation value, comprising the following sub-steps:
        (i) the external temperature sensor detecting the hard-disk external temperature of the hard disk drive;
        (ii) a basic input/output system of the computer device obtaining a hard-disk internal temperature of the hard disk drive from the internal temperature sensor;
        (iii) subtracting the hard-disk internal temperature from the hard-disk external temperature to obtain a calibrated preset compensation value; and
        (iv) updating the value of value as the preset compensation value in the data memory unit with the calibrated preset compensation value for use the next time the computer device is started up.

6. The method as claimed in claim 1, wherein the preset compensation value is obtained through the following steps:
    (I) placing a test hard disk drive in a test computer device in a preset temperature environment having a temperature less than the hard-disk activation temperature threshold, wherein no power is initially supplied to the hard disk drive;
    (II) using the heater to heat said test hard disk drive;
    (III) using an external temperature sensor of the test computer device to obtain a hard-disk external temperature of said test hard disk drive;
    (IV) supplying power to said test hard disk drive and an internal temperature sensor thereof when the external temperature sensor detects that the hard-disk external temperature of said test hard disk drive is equal to the hard-disk activation temperature threshold;
    (V) using a basic input/output system of the computer device to obtain a hard-disk internal temperature of said test hard disk drive from the internal temperature sensor thereof;
    (VI) subtracting the hard-disk internal temperature from the hard-disk external temperature to obtain a preset compensation value of said test hard disk drive; and
    (VII) repeating the above steps for a plurality for additional test hard drives and averaging the preset compensation values obtained therefrom.

7. The method as claimed in claim 6, wherein the test hard disk drive to be tested of step (I) is randomly selected among a plurality of the hard disk drives.

8. The method as claimed in claim 6, wherein the hard-disk internal temperature obtained in step (V) is a lowest one selected from a number of hard-disk internal temperatures of said one hard disk drive obtained by the basic input/output system of the computer device from a plurality of internal temperature sensors.

9. The method as claimed in claim 1, wherein the first preset location is external to the hard disk drive.

* * * * *